(12) United States Patent
Aschauer

(10) Patent No.: US 7,055,657 B2
(45) Date of Patent: Jun. 6, 2006

(54) WET FRICTION DEVICE WITH INWARD AND OUTWARD CIRCULATING COOLING MEANS

(76) Inventor: George Reisch Aschauer, 2214 Red Oak Ct. NE., Bemidji, MN (US) 56601

( * ) Notice: Subject to any disclaimer, the term of this patent is extended or adjusted under 35 U.S.C. 154(b) by 142 days.

(21) Appl. No.: 10/760,981

(22) Filed: Jan. 20, 2004

(65) Prior Publication Data

US 2005/0158170 A1    Jul. 21, 2005

(51) Int. Cl.
*F16D 55/02*    (2006.01)
*F16D 65/833*   (2006.01)

(52) U.S. Cl. .............. 188/71.6; 188/264 CC; 188/264 D; 192/70.12

(58) Field of Classification Search .............. 192/70.12
See application file for complete search history.

(56) References Cited

U.S. PATENT DOCUMENTS

| | | | | |
|---|---|---|---|---|
| 3,094,194 A | * | 6/1963 | Kershner | 188/71.6 |
| 3,897,860 A | * | 8/1975 | Borck et al. | 192/113.36 |
| 4,022,298 A | * | 5/1977 | Malinowski | 192/70.12 |
| 4,269,289 A | * | 5/1981 | Winkler | 188/71.6 |

* cited by examiner

*Primary Examiner*—Rodney H. Bonck

(57) ABSTRACT

An interleaved friction plate braking device having a multiplicity of confined curved or slanted vanes on the outside diameter of the rotating driven plates to impact a stationary fluid reservoir and impart inward flow thru passages to more completely cool and lubricate the sliding surfaces.

1 Claim, 2 Drawing Sheets

WET FRICTION DEVICE WITH INWARD AND OUTWARD CIRCULATING COOLING MEANS

BACKGROUND OF THE INVENTION

The invention relates to a method of cooling the friction surfaces of a wet interleaved friction disc by using vaned impellers acting as inward pumps. Commonly used cooling methods are forced flow outward circulation; or dip or splash cooling as the rotating plates dip into a sump or reservoir.

The use of forced flow cooling places a high emphasis on oil passage design including plate grooving, oil dispersion to the friction surfaces as well as rotating seals, a sump reservoir and a positive displacement pump. e.g. Aschauer U.S. Pat. No. 3,833,100 Higher cost and complexity result. In sump cooling the rotating discs may dip into a sump or impinge an annular surrounding oil reservoir or torus created by centrifugal action. If the plates dip into these reservoirs excessively, for example, one third dip to full immersion objectionable viscous drag occurs resulting in heating and power loss.

Considerable effort has been devoted exploring the optimum friction surface cooling, balancing excess oil flow with ensuing drag loss, versus insufficient cooling giving limited or marginal oil cooling amounts for certain discs in the pack. Speed of operation affects with internal outward forced cooling as well as dip or splash cooling.

At lower speeds centrifugal pressure is relatively low and circulation may be poor for forced cooling. Conversely at high speeds the coolant may be accelerated too rapidly and follow a path of least resistance resulting in incomplete friction surfaces cooling.

For dip or splash cooling the dip level, surrounding housing clearance and speed all affect performance. Higher speeds tend to fling coolant away from the discs depriving them of internal surface cooling.

Commonly used friction plates consist of an annular metal core with toothed drive means faced by annular friction discs on both sides bonded to the core.

The friction material compositions are well known as paper, sintered metals or graphitic with suitable coolant passage grooving, such as radial, angular, curved or waffle patterns, e.g. Aschauer U.S. Pat. No. 3,063,531. The friction surfaces operate against adjoining plates usually having a flat smooth steel surface. For the present invention vanes extending from the outer diameter of the friction plate cores act as radial flow pumps.

A radial flow pump conventionally consists of a rotating bladed impeller surrounded by stationary walls discharging into confined surrounding chamber. The performance is projected by the difference in inlet and outlet velocity diagrams which include both absolute rotational velocity and relative velocity between the moving fluid and moving impeller blade. Velocity is converted into pressure.

Pump design is a complex procedure relying heavily upon existing pump performance data. Consequently the determinations for the vaned impellers used in the present invention analysis are uncertain to the extent that substantial reserve factors are included in the analysis.

SUMMARY OF THE INVENTION

A multiplicity of curved or slanted vanes on the outside diameter of rotating friction plates impact a fluid reservoir or sump, ingest coolant and accelerate the coolant inwardly acting as impellers. Enlarged mating plates on both sides of the friction plate vane impellers act as housing walls to confine the pumping action. The vane impellers are extensions of the friction plate core outer diameter and are part of the core. Coolant inflow velocity terminates at the core outside diameter and converts to pressure to drive the coolant inwardly thru the friction surface grooving to provide cooling of the faces.

The enclosed confined friction plate stack interior describes a partially filled cylinder generating outward centrifugal force or pressure greatest at the facings outside diameters. This pressure is proportional to peripheral velocity. The vanes impacting the fluid reservoir generate an inward pressure that in all instances is greater than and will overcome the centrifugal outward pressure causing inward flow thru the grooving.

In the embodiment shown coolant is forced inwardly thru the friction surface grooves as the vanes impinge the coolant reservoir. During the remainder of a revolution cycle centrifugal force provides outward cooling flow returning the fluid to the reservoir. This gives both inward and outward cooling flow both proportional to the rotating speed.

DETAILED DESCRIPTION OF THE INVENTION

Figure 1:
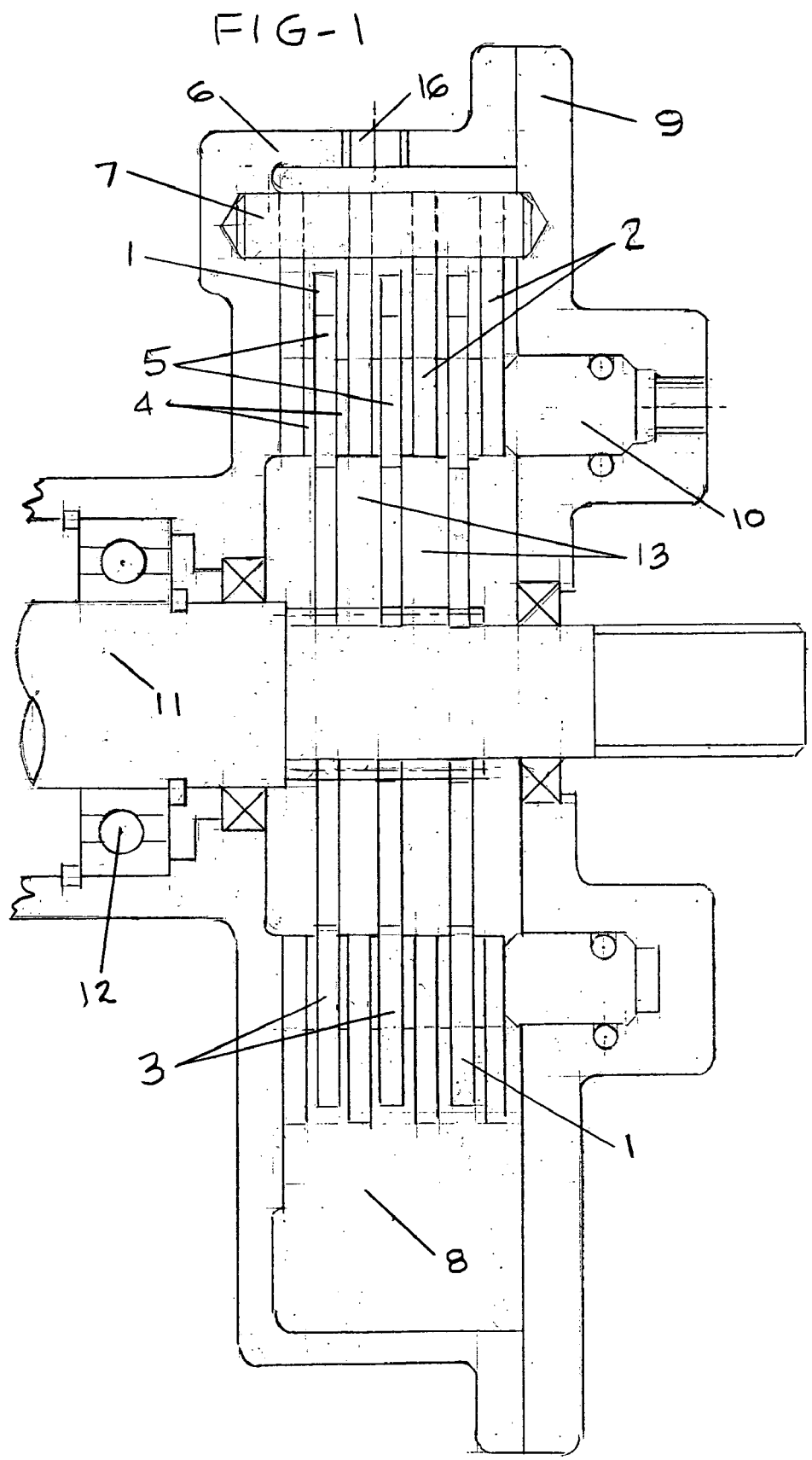
FIG. 1 is a cross sectional view thru a wet brake embodying the present invention.

Referring to FIG. 1 it may be preferable to mount a brake ahead of the final drive as speed is higher and torque is lower. Energy absorbed by the brake is the same regardless of the location selected. Stationary housing 6 shown integral with the final drive housing acts to support drive shaft 11 through bearing 12.

Figure 2:
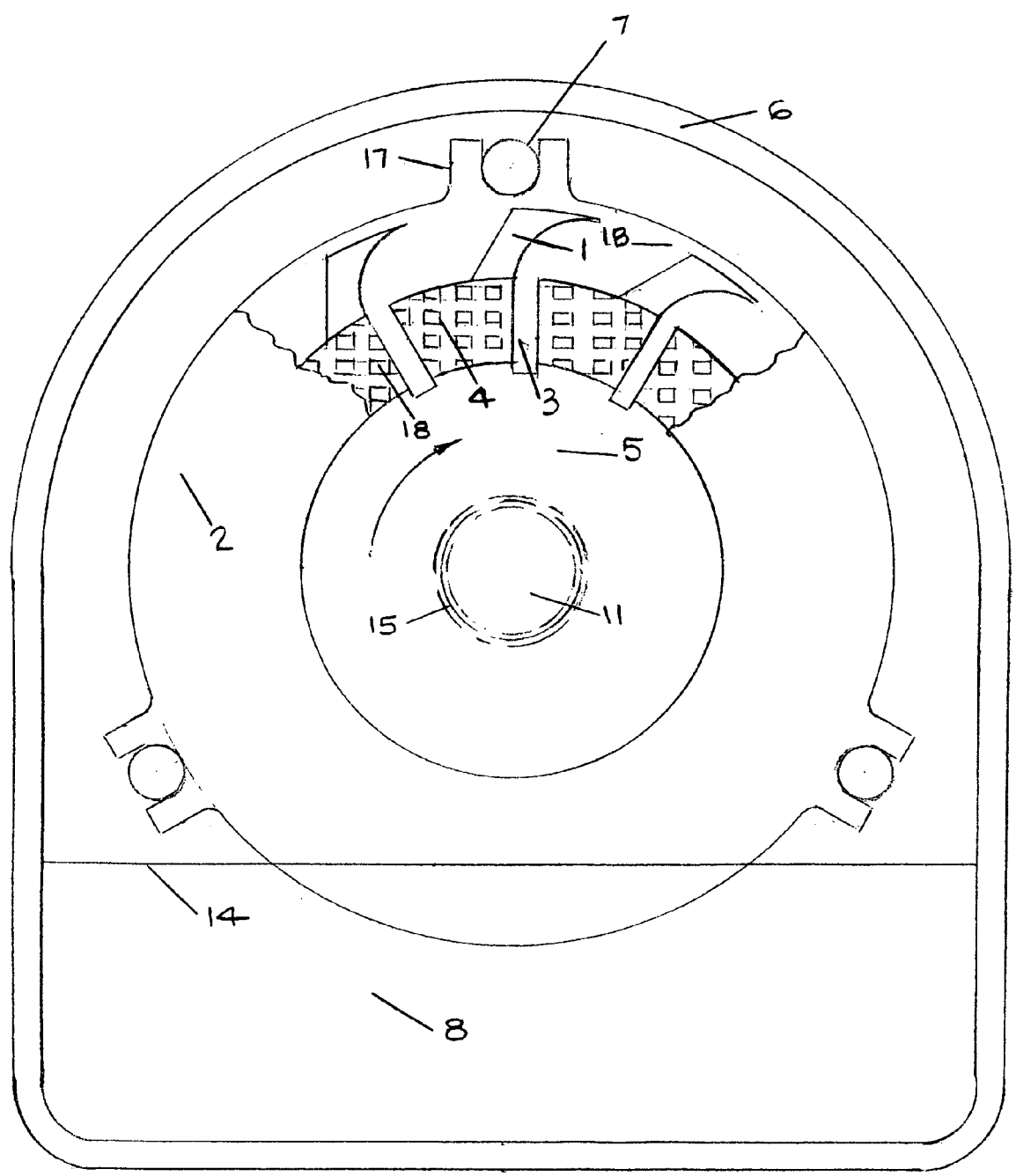
FIG. 2 is a transverse sectional view of the friction plate stack and surrounding housing with coolant reservoir. It describes three different impeller styles.

Interleaved friction plates 5 and spacer plates 2 make up a friction plate stack package. Each friction plate metal core has a multiplicity of vaned pump impellers 1 extending beyond the outside diameter of the friction surfaces 4. Different shaped pumping impellers may be used, including the three shown in portions of FIG. 2. Spacer plates 2 on both sides of friction plate 5 are separated from the cores of plate 5 by the thickness of friction material 4. The spacer plates 2 outside diameter extends beyond each impeller tip and encloses it. During rotation an individual pumping chamber is made up of a pumping impeller vane surface, the back side of the adjacent leading vane, the enclosing side walls of spacer plates 2 and the core 5 outside diameter portion between the two vanes. The inlet area is made up of the peripheral length of spacer plates 2 outer diameter between the tip of an impeller vane and back side of the adjacent ahead vane and the distance between and the enclosing spacer plate 2 side walls. Each individual chamber discharges inwardly into friction plate grooves 3 to provide lubrication and cooling. Two forces are predominant during operation, the inward pumping pressure and outward centrifugal pressure acting upon the coolant.

In the embodiment shown, during a portion of a revolution cycle impeller vanes 1 dip into reservoir 8 at level 14 and discharge inwardly thru grooves 3 into atmospheric pressure chamber 13, bounded by the friction plates 5 on the outside, the shaft 11 on the inside and housing 6 and cover 9 on the sides. During the remainder of the revolution cycle centrifugal pressure forces the coolant outward from chamber 13 thru grooves 3 to return to reservoir 8. A dual friction surface cooling circulation is established inward and outward during each revolution cycle.

Inward pumping force and outward centrifugal force are functions of rotative speed and vane and friction plate diameter. Centrifugal force resists inward pumping flow and provides outward return flow.

Centrifugal pressure is formulated as a constant times speed squared times radius squared.

Pump pressure is based on exit velocity and is again a constant times speed squared times radius squared. In all instances the constant for inward pumping pressure is substantially greater than the constant for centrifugal outward pressure, even if chambers 13 were entirely filled and centrifugal force eminated from the center of rotation.

The reasons for not including a mathematical analysis for the pumping head and centrifugal head is as follows. If all coolant is exhausted from chamber 13 during that portion of the cycle then no centrifugal head is available at the pumping vane entry to the reservoir. The operating coolant level in chamber 13 cannot be readily ascertained. Assuming worst case conditions of maximum centrifugal head and least pressure increase for the pumping blades and finding that the pumping force is always greater, provides the desired reserve factor. The level of dip is another factor. There are too many interacting variables to predict inward and outward flow with accuracy for an analysis.

Simplified it may be said that both centrifugal pressure and pump exit pressure rely on peripheral velocity, centrifugal head upon radius of origin, pump velocity or head upon the impeller design exit flow condition. Since the friction plate groove areas remain constant inward and outward flow is proportional to those pressures. As in all wet brakes or clutches excessive coolant flow to give complete surface cooling must be balanced against objectionable released operating condition drag loss.

Numerous blade shapes may be utilized to best satisfy conditions of rotational speed and coolant reservoir conditions. The curved impeller blades shown in chamber 1a in FIG. 2 turn the fluid around 180° and in theory double the entrance velocity. Chamber 1a receives coolant from the backward curved impeller vane 1 and discharges along friction plate core 5 outer diameter between vanes to abut a decelerating wall formed on the rear side of the leading adjacent vane, and discharges inwardly thru the friction surface grooving. Side plates 2 support and confine the pressure chamber 1a. Chamber 1b receives coolant from the backward curved impeller vane and discharges directly into the friction surface grooving. Side plates 2 support the pressure. Chamber 1c has a pressure chamber formed between the backward curved impeller face and the back side of the adjacent leading blade providing a circular chamber for a large portion of its periphy. The chamber 1c is supported by mating side plates 2 and discharges into friction plate grooves 3. Slanted vanes may also be used. Backward curving vane is defined as receding from the impeller vane entrance tip backward away from and rearward with respect to the direction of rotation of the impeller vane. Stationary housing 6 is sealably attached to cover 9 to enclose the friction plate package and provides a sump or reservoir for the coolant. Spacer plates 2 have external lugs 17 that fit loosely on pins 7 to provide a slidable connection. Cover 9 also provides an enclosed pressure chamber for conventional engaging piston 10 acting to engage the brake. Stationary pins 7 are supported at one end by housing 6 and at the other end by cover 9.

The cores of friction plate 5 have spliced internal teeth to slidably engage with mating teeth on drive shaft 11 which is part of the drive train.

Port 16 connects to an atmospheric breather conduit. It is noted that inward pumping vanes are sensitive to direction of rotation to generate inward flow.

I claim:

1. An interleaved wet friction plate braking device comprising,
    a stationary housing which carries a plurality of annular stationary brake plates and which has a stationary fluid reservoir containing coolant;
    a rotatable shaft, a plurality of annular friction plates mounted to rotate with the shaft, said friction plates having friction lining attached thereto, the friction lining having grooves;
    an actuator adapted to axially press the friction plates into braking engagement with the brake plates;
    a plurality of impeller vanes extending from the outer periphery of the friction plates and adapted to impact the stationary reservoir during a part of the rotation of the friction plates,
    the brake plates having a diameter greater than that of the friction plates including the impeller vanes but disposed axially closely adjacent to the vanes,
    wherein, during said part of the rotation of the friction plates, the brake plates, in combination with an area rotationally between adjacent impelle vanes, define a pressure chamber so as to impart inward flow of coolant through the grooves of the friction lining as the impeller vanes pass through the coolant in the stationary reservoir, and wherein during a remaining part of the rotation of the friction plates, coolant is permitted to flow radially outward by centrifugal force.

* * * * *